United States Patent [19]

Nanba

[11] Patent Number: 4,926,256
[45] Date of Patent: May 15, 1990

[54] BILLING DATA DISPLAY SYSTEM FOR A CLOSED CIRCUIT TELEVISION SYSTEM

[75] Inventor: Keiichiro Nanba, Tokyo, Japan
[73] Assignee: Pioneer Electronic Corporation, Tokyo, Japan
[21] Appl. No.: 386,479
[22] Filed: Jul. 28, 1989

[30] Foreign Application Priority Data

Aug. 8, 1988 [JP] Japan .................. 63-196128

[51] Int. Cl.⁵ .............. H04N 7/10; H04H 9/00
[52] U.S. Cl. ............................ 358/84; 358/86; 455/2; 455/5
[58] Field of Search .......... 358/84, 86; 455/2, 4, 455/5

[56] References Cited

U.S. PATENT DOCUMENTS

| | | | |
|---|---|---|---|
| 4,809,325 | 2/1989 | Hayashi et al. | 358/84 X |
| 4,816,904 | 3/1989 | McKenna et al. | 358/84 |
| 4,885,775 | 12/1989 | Lucas | 358/86 X |

FOREIGN PATENT DOCUMENTS

| | | | |
|---|---|---|---|
| 63-24778 | 2/1988 | Japan | 358/86 |
| 63-177673 | 7/1988 | Japan | 358/86 |
| WO86/01962 | 3/1986 | World Int. Prop. O. | 358/86 |

Primary Examiner—Keith E. George
Attorney, Agent, or Firm—Sughrue, Mion, Zinn, MacPeak & Seas

[57] ABSTRACT

In a closed circuit television system having a central facility connected to a plurality of terminals, it is possible to display billing data showing charges for hotel accommodations, pay television reception, equipment use, etc., at the terminals. The computer in the central facility stores data corresponding to the charges owed by a customer at one of the terminals. When a customer wishes to see his bill, he depresses a button at his terminal. The appropriate charges are retrieved from the computer and superposed on a fixed picture which has been transmitted from the central facility so that the superposed picture may be displayed at the terminal.

16 Claims, 3 Drawing Sheets

BILLING DATA DISPLAY SYSTEM FOR A CLOSED CIRCUIT TELEVISION SYSTEM

BACKGROUND OF THE INVENTION

The present application is related to application Ser. No. 312,166, entitled "Billing Data Display System and Terminal Used Therein for a Closed Circuit Television System", filed on Feb. 21, 1989 and commonly assigned.

The present invention relates to a closed circuit TV system (hereinafter referred to as a "CCTV system") in which the central facility is connected through cables to a number of terminals, so that video signals are transmitted to the terminals. More particularly, the present invention relates to a billing data display system therefore in which monetary charge data (a bill) for the use of chargeable equipment and/or for the reception of pay television programs at the terminals are displayed on the television sets.

The CCTV system is employed, for instance, in a hotel. In the system, whenever a pay television program is received by any one of the terminals installed in the rooms of the hotel, the monetary charge for it is stored, as monetary charge data, in a computer at the central facility. The monetary charge data is determined according to the time period of reception, so that for instance when the guest checks out of the hotel, the monetary charge data together with the hotel charges is printed out for him.

However, with the conventional system, it is impossible for him to know the monetary charges for the reception of pay television programs, for the eating and drinking of food in the refrigerator in the room or at the restaurant in the hotel, for the use of a computerized game in the room and other charges other than the lodging (room) charge before he checks out of the hotel.

SUMMARY OF THE INVENTION

Accordingly, an object of the present invention is to provide a CCTV system in which, when a guest wants to know monetary charges (a bill) before checking out of a hotel, the charges are displayed on the television set in his room in detail merely by operating a request button. When such requests are made by a number of guests simultaneously, a respective bill can be quickly transmitted to each of the guests who have made the requests.

The foregoing object of the present invention has been achieved by the provision of a billing data display system for a CCTV system in which, according to the present invention, in response to the operation of a request button at any one of the terminals, the computer in the central facility collects all the monetary charges for the guest who has operated the request button at his terminal and transmits them as data signals to that terminal. The central facility transmits a fixed picture on a predetermined channel to the terminal, while that terminal superposes the numerical data obtained from the data signals on the fixed picture.

DETAILED DESCRIPTION OF THE PREFERRED EMBODIMENT

One example of a bill display system for a CCTV system according to the present invention will be described with reference to FIG. 1.

Figure 1:
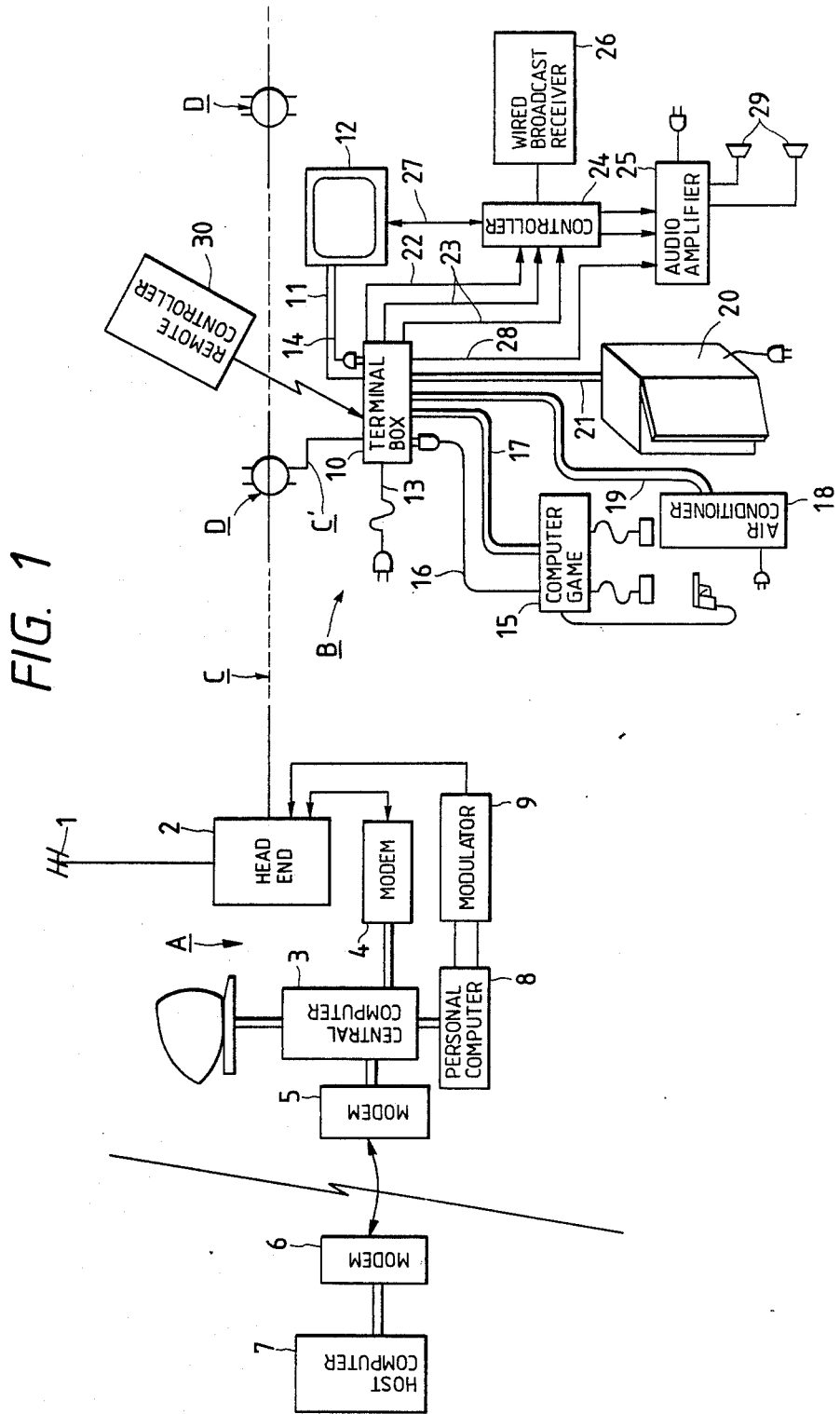
FIG. 1 is a block diagram showing the arrangement of a billing data display system for a CCTV system according to the present invention.

In the system, as shown in FIG. 1, a central facility A is connected through a main cable C to several hundred terminals B. Each terminal is provided, for instance, in a different room of a hotel. More specifically, the terminals B are connected through drop cables C' to branching elements D, respectively, which are connected to the main cable C.

The central facility A has a head end 2 which subjects a television broadcast signal received through an outdoor antenna 1 to frequency conversion and transmits the signal thus processed to the terminals B, and supplies video signals provided by a video tape recorder or video disc player (not shown) to the terminals B. The head end 2 is connected to a modem 4 for transmitting data between a central computer 3 and each of the terminals B.

The central computer 3 is connected through telephone modems 5 and 6 to a host computer 7 which sums monetary charges for each of the rooms.

The central computer 3 and the host computer 7 operate in combination to store data such as charges for the reception of pay television programs and for the use of chargeable equipment. And, in response to a request for indication of such charges from any one of the rooms, they operate to collect the charges and transmit them to that room.

The central facility A further comprises: a personal computer 8 which is used as a character generator for forming a predetermined fixed image. The output of the personal computer 8 is modulated into a predetermined television channel by a modulator 9. The output thus modulated is applied to the head end 2, so that it is applied to the cable C together with the television broadcast signal processed by the head end 2 or video signals provided by a video disc player or the like.

Each of the terminals B installed in the rooms essentially comprises: a terminal box 10; and a television set 12 connected through a cable 11 to the terminal box 10.

The terminal box 10 has a power line 13 for receiving commercial electric power, and an AC outlet through which electric power is supplied to the power line 14 of the television set. The terminal box 10 is further provided with an AC outlet to which the power line 16 of a computerized game 15 is connected, and a cable 17 through which signals are transmitted to the game 15. In addition, the terminal box 10 is connected to a signal line 19 used for the central facility A to control the on-off operation of an air conditioner 18 installed in the room, and to a signal line 21 for transmitting the charges for use of a refrigerator 20 in the room to the central facility A.

Furthermore, a video signal line 22, and right and left channel audio signal lines 23 are extended from the terminal box 10, and connected to a controller 24. When video signals are available, the controller 24 applies to an audio amplifier 25 television audio signals received through the terminal box 10. When video signals are not available, controller 24 applies the audio signals received, for instance, through a wired broadcast receiver 26. The controller 24 is further provided with a cable 27 through which a television base band signal is supplied to the television set 12 when necessary.

A control line 28 is connected between the audio amplifier 25 and the terminal box 10 to apply a volume control signal provided by the terminal box 10 to the audio amplifier 25. That is, the sound volumes of loudspeakers 29 can be adjusted by a sound volume controlling operation effected by the terminal box 10.

The terminal box 10 is provided with a remote controller 30. The remote controller 30 is designed so that it can cause the terminal box to perform almost all of its functions.

Figure 2:
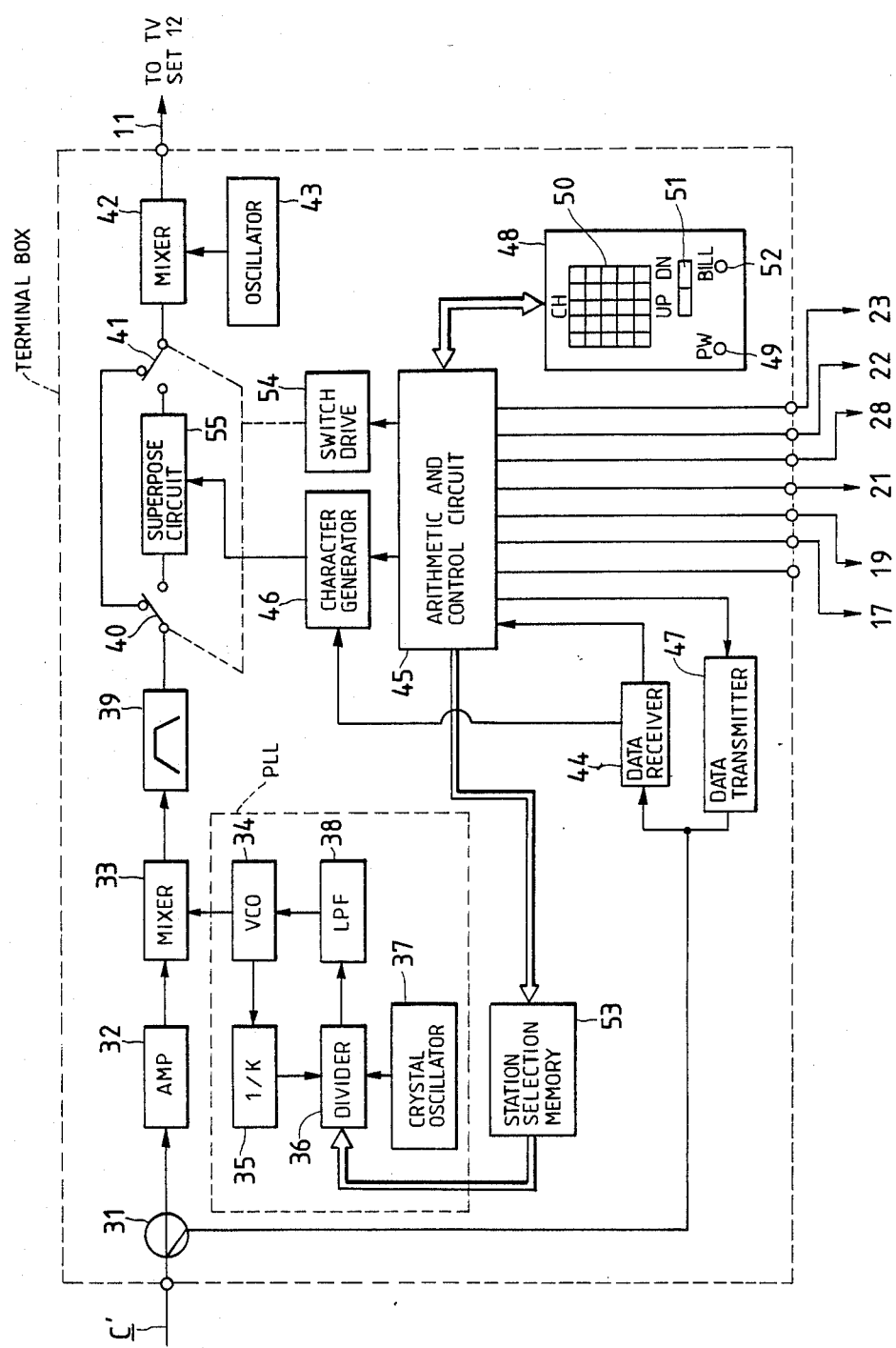
FIG. 2 a block diagram showing a terminal employed in the system of the present invention.

FIG. 2 is a block diagram showing the arrangement of the terminal box 10 described above.

As shown in FIG. 2, a video signal (91.25 to 450 MHz) transmitted through the drop cable C' is applied through a branching element 31 to an RF amplifier 32. The output of the RF amplifier 32 is applied to a mixer 33. The mixer 33 is connected to a phase-locked loop (PLL) made up of a voltage-controlled oscillator (VCO) 34, a prescaler 35, a programmable divider 36, a crystal oscillator 37, and a low-pass filter (LPF) 38.

The PLL forms a first local oscillator, and an intermediate frequency output selected thereby is applied through an intermediate frequency filter 39 and switches 40 and 41 to a second mixer 42.

The television signal applied to the second mixer 42 is converted into an RF empty channel with the aid of the output signal of a second local oscillator 43 connected to the second mixer 42. The output of the second mixer 42 is applied to an output line 11 provided for the television set 12.

On the other hand, the "down" data signal transmitted over the cable C' is applied through the branching element 31 to a data receiver 44. The "down" signal is demodulated and a portion is applied to an arithmetic and control circuit 45, and another portion of the signal is applied to a character generator 46.

Further, in FIG. 2, reference numeral 47 designates a data transmitter. The data transmitter operates as follows: when, for instance, the television set 12 is used to receive a chargeable program, the game 15 is used, or a drink is taken out of the refrigerator 20, the monetary charge for it together with the address code of the terminal is transmitted to the central facility A.

Further, in FIG. 2, reference numeral 48 designates an operating keyboard which, in the embodiment, includes a power control button (PW) 49 for controlling the on-off operation of the essential components of the terminal, a channel selecting button (CH) 50 for selecting a desired television channel, sound volume control buttons 51 for controlling the volume of the loudspeakers, and a bill request button (BILL) 52 for requesting the transmission of data on monetary charges for the use of the game, and so forth. The outputs of these buttons are applied through the arithmetic and control circuit 45, respectively, to a station selection memory 53, the data transmitter 47, and a switch drive circuit 54.

When, in the system thus organized, in any one of the terminals B the channel select button 50 is depressed to select a desired television channel, the arithmetic and control circuit 45 applies station selection channel data to the station selection memory 53. In response to the channel data, the station selection memory 53 applies the divider coefficient corresponding to the channel thus selected to the programmable divider 36 so that the first local oscillator comprising the PLL is activated. Thus, the channel selecting operation has been accomplished.

The arithmetic and control circuit 45 applies the selected channel data to the data transmitter 47. The data transmitter 47 transmits the channel data together with the address code of the terminal to the central facility A.

As described above, the arithmetic and control circuit 45 is connected to the signal lines 17 and 21 for detecting the use of the computerized game 15 and the refrigerator 20 provided in the room. Therefore, whenever they are used, the monetary charge data thereof together with the address data of the terminal are transmitted by the data transmitter 47 to the central facility A.

On the other hand, in the central facility A. the central computer 3 determines whether or not a television program being received by the terminal is chargeable. When it is determined that the program is chargeable, the monetary charge for it is calculated by the length of time, and applied, as monetary charge data, through the modems 5 and 6 to the host computer 7 and stored therein.

Similarly, the host computer 7 stores monetary charge data for the use of the chargeable equipment in the room.

Now, the monetary charge (or billing data) display system, in which the specific feature of the invention resides, will be described.

When a guest in a room provided with a terminal B wants to know the billing data for the reception of a pay television program or programs, or the charge for the use of the rented equipment together with the hotel charges, he will operate the bill request button 52.

In response to the operation of the bill request button 52, the arithmetic and control circuit 45 causes the data transmitter 47 to transmit a bill request signal to inform the central facility A of the operation of the bill request button together with the address of the terminal B. In the central facility, the signal is applied through the modem 4 to activate the central computer 3. As a result, it is determined which of the terminals B has transmitted the bill request signal. The billing data for that terminal, and accordingly the billing data for the corresponding guest, is read out of the host computer 7.

At the same time, the central computer 3 transmits data for forcibly causing the terminal B (which has transmitted the bill request signal) to tune to the transmission channel of the modulator 9 (hereinafter referred to as "forcible tuning data", when applicable) through the modem 4.

Figure 3:
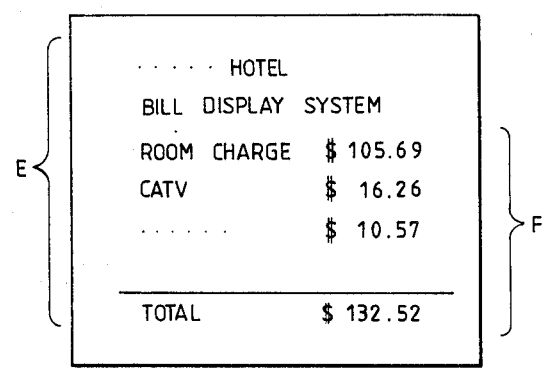
FIG. 3 is an explanatory diagram showing one example of a picture displayed in the system.

The forcible tuning data is received by the arithmetic and control circuit 45 through the data receiver 44. The circuit 45 applies the forcible tuning data to the station selection memory 53. As a result, the first local oscillator of the PLL is locked to a local oscillation frequency for the purpose of tuning the terminal to the predetermined channel. That is, the terminal is tuned to receive, for instance, a fixed picture E, as shown in FIG. 3, transmitted by the central facility A.

On the other hand, in the terminal B, the switch drive circuit 54 is operated in response to the operation of the bill request button 52 to trip the armatures of the switches 40 and 41 so that the intermediate frequency filter 39 is connected through a superpose circuit 55 to the second mixer 42. That is, the superpose circuit 55 superposes the output video signal of the character generator 46 on the received picture.

In the central facility A, the host computer 7 transfers the billing data prepared for the terminal to the central computer 3. Central computer 3 transmits the billing data together with the terminal address to the terminal B. Therefore, in the terminal B, the billing data is applied to the character generator 46 through the data receiver 44, so that the output numerical data F of the character generator 46 is superposed on the picture E by the superpose circuit 55 as shown in FIG. 3.

As described above, with the billing data display system of the present invention, the monetary charge for the reception of a pay television program or the use of chargeable equipment in each of the rooms can be displayed on the television set in the room merely by depressing the bill request button. This will greatly contribute to the improvement of service in the hotel.

Furthermore, the system is designed so that the fixed picture having a relatively large quantity of transfer information is transmitted on the predetermined television channel by the central facility and the numerical data having a relatively small quantity of transfer information is transmitted on the "down" data channel. Thus, the numerical data are superposed on the fixed picture. Therefore, even when a bill request is made by a number of terminals simultaneously, the billing data can be displayed relatively quickly. Furthermore, the contents of the fixed picture can be modified with the change of seasons or time on the side of the central facility, or the configuration or color of the picture can be freely changed.

WHAT IS CLAIMED IS:

1. A billing data display system for a closed circuit TV system in which a central facility transmits video signals to a plurality of terminals which are each operated by a respective customer, said system comprising:
    means at said central facility for storing monetary charge data corresponding to charges owed by said customers;
    means at each terminal for requesting transmission of the monetary charge data:
    means at said central facility for transmitting, in response to said monetary charge data request means, said monetary charge data to said terminals;
    character generator means at said central facility for transmitting a fixed picture on a predetermined frequency channel;
    character generator means at each terminal for converting said monetary charge data provided by said central facility into billing picture data which is superposed on said fixed picture to obtain a composite billing picture; and
    means at each terminal for displaying said composite billing picture.

2. A billing data display system as claimed in claim 1, wherein said monetary charge data includes data corresponding to charges for the reception of pay television programs by said terminals.

3. A billing data display system as claimed in claim 2, wherein said pay television programs are shown on said display means.

4. A billing data display system as claimed in claim 1, wherein said monetary charge data includes data corresponding to accommodation charges.

5. A billing data display system as claimed in claim 1, wherein said monetary charge data includes data corresponding to charges for equipment other than for viewing pay television programs used by said customers.

6. A billing data display system as claimed in claim 1, wherein said billing data display system is used in a hotel and each of said terminals is located in a respective hotel room.

7. A billing data display system as claimed in claim 1, wherein said means for requesting monetary charge data comprises a request button.

8. A billing data display system as claimed in claim 1, wherein said display means is a television set.

9. A billing data display method for a closed circuit TV system in which a central facility transmits video signals to a plurality of terminals which are each operated by a respective customer, said method comprising the steps of:
    storing at said central facility monetary charge data corresponding to charges owned by said customers;
    requesting transmission of said monetary charge data from said central facility to said terminals;
    transmitting said monetary charge data to said terminals in response to said request on a "down" data channel;
    transmitting a fixed picture from said central facility to said terminals on a predetermined frequency channel other than said "down" data channel;
    converting said transmitted monetary charge data into billing picture data which is superposed on said fixed picture to obtain a composite billing picture; and
    displaying said composite billing picture.

10. A billing data display method as claimed in claim 9, wherein said monetary charge data includes data corresponding to charges for the reception of pay television programs by said terminals.

11. A billing data display method as claimed in claim 10, wherein said pay television programs are shown on said display means.

12. A billing data display method as claimed in claim 9, wherein said monetary charge data includes data corresponding to accommodation charges.

13. A billing data display method as claimed in claim 9, wherein said monetary charge data includes data corresponding to charges for equipment other than for viewing pay television programs used by said customers.

14. A billing data display method as claimed in claim 9, wherein said billing data display system is used in a hotel and each of said terminals is located in a respective hotel room.

15. A billing data display method as claimed in claim 9, wherein said step of requesting monetary charge data is implemented using a request button.

16. A billing data display method as claimed in claim 9, wherein said display step is implemented using a television set.

* * * * *